United States Patent
Haagens et al.

(10) Patent No.: US 7,363,541 B2
(45) Date of Patent: Apr. 22, 2008

(54) COMMAND MANAGEMENT USING TASK ATTRIBUTES

(75) Inventors: Randolph B. Haagens, Roseville, CA (US); Mallikarjun Chadalapaka, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 438 days.

(21) Appl. No.: 10/785,500

(22) Filed: Feb. 23, 2004

(65) Prior Publication Data

US 2005/0216789 A1    Sep. 29, 2005

(51) Int. Cl.
G06F 11/00    (2006.01)
G06F 11/28    (2006.01)

(52) U.S. Cl. .................. 714/20; 714/6; 714/50

(58) Field of Classification Search ............ 714/6, 714/20, 50; 709/246
See application file for complete search history.

(56) References Cited

U.S. PATENT DOCUMENTS

| | | | |
|---|---|---|---|
| 665,700 A | 1/1901 | Stevens | |
| 5,446,871 A * | 8/1995 | Shomler et al. | 714/1 |
| 5,555,371 A * | 9/1996 | Duyanovich et al. | 714/13 |
| 5,742,792 A * | 4/1998 | Yanai et al. | 711/162 |
| 5,933,653 A * | 8/1999 | Ofek | 710/6 |
| 6,173,377 B1 | 1/2001 | Yanai et al. | |
| 6,205,494 B1 * | 3/2001 | Williams | 710/5 |
| 6,499,075 B2 | 12/2002 | Oeda et al. | |
| 6,502,205 B1 | 12/2002 | Yanai et al. | |
| 6,539,462 B1 * | 3/2003 | Mikkelsen et al. | 711/162 |
| 6,598,129 B2 | 7/2003 | Kanda et al. | |
| 6,606,697 B1 | 8/2003 | Kawahara et al. | |
| 6,640,281 B2 | 10/2003 | Obara et al. | |
| 6,647,514 B1 | 11/2003 | Umberger et al. | |
| 6,654,830 B1 | 11/2003 | Taylor et al. | |
| 6,658,526 B2 | 12/2003 | Nguyen et al. | |
| 6,665,700 B1 | 12/2003 | Sugisaki et al. | |
| 6,898,685 B2 * | 5/2005 | Meiri et al. | 711/167 |
| 6,915,354 B1 * | 7/2005 | Ozdemir et al. | 710/5 |
| 6,978,347 B2 * | 12/2005 | Nakamura et al. | 711/114 |
| 7,010,548 B2 * | 3/2006 | Jones et al. | 707/104.1 |
| 7,032,131 B2 * | 4/2006 | Lubbers et al. | 714/16 |
| 7,065,589 B2 * | 6/2006 | Yamagami | 709/246 |
| 7,111,189 B1 * | 9/2006 | Sicola et al. | 714/6 |
| 7,143,122 B2 * | 11/2006 | Burton et al. | 707/204 |
| 2003/0084241 A1 | 5/2003 | Lubbers et al. | |
| 2004/0260976 A1 * | 12/2004 | Ji et al. | 714/31 |

OTHER PUBLICATIONS iSCSI: The Universal Storage Connection by John Hufferd Published by Addison Wesley Professional, Nov. 5, 2002 included: section "SCSI Bus Interconnect", section "iSCSI Interconnect", section "Tagged and Untagged Tasks".*

* cited by examiner

*Primary Examiner*—Scott Baderman
*Assistant Examiner*—Joseph Schell

(57) ABSTRACT

An efficient technique for performing remote asynchronous mirroring includes receiving a stream of command requests, performing the requested commands, relaying the requested commands to a target while embedding an explicitly-defined or implied task precedence graph in the relayed commands to enable increased concurrency in tasks performed by the target.

26 Claims, 9 Drawing Sheets

COMMAND MANAGEMENT USING TASK ATTRIBUTES

BACKGROUND OF THE INVENTION

Maintenance of multiple copies of data is part of the disaster recovery function in data processing operations to deal with the eventuality that the data is unavailable, damaged, or lost. Institutional users of data processing systems commonly maintain quantities of highly important information and expend large amounts of time and money to protect data against unavailability resulting from disaster or catastrophe. One class of techniques for maintaining redundant data copies is termed mirroring, in which data processing system maintains copies of valuable information on-site on a removable storage media or in a secondary mirrored storage site positioned locally or remotely. Remote mirroring off-site but within a metropolitan distance, for example up to about 200 kilometers, protects against local disasters including fire, power outages, or theft. Remote mirroring over geographic distances of hundreds of kilometers is useful for protecting against catastrophes such as earthquakes, tornados, hurricanes, floods, and the like. Many data processing systems employ multiple levels of redundancy to protect data, positioned at multiple geographic distances.

Data processing systems realize remote mirroring using synchronous mirroring or asynchronous mirroring. Synchronous remote copies have advantages when response time is relatively unimportant, distances between primary and secondary storage are short, and data cannot be lost. Synchronous mirroring is generally selected as a best choice for rapid recovery. In contrast, asynchronous mirroring is used when the smallest possible performance impact is to be imposed on the primary site, speed is important, and mirrored data is to travel long distances. Asynchronous mirroring is often used for very large geographical scale operations when loss of most recent data is acceptable.

Precedence graph equivalence for a remote mirroring system means that the write commands to the storage, as defined by the initiator on the primary site, are committed in the same order on the secondary target so that the data on the secondary target at all times have sufficient data consistency to recover from a disaster. A simple and straightforward technique to ensure precedence graph equivalence has been to record the exact execution order of each command on a primary target and communicate the ordered list to the secondary target. The secondary target can then execute the commands in precisely the same order, preserving execution-order equivalence. Execution-order equivalence is thus a more highly constrained subcase of desired precedence graph equivalence. The difficulty with a system constrained to execution-order equivalence is that execution of a list of commands in a purely sequential order at the secondary target imposes long delays in circumstances when many commands could otherwise execute concurrently and in an unconstrained order. In the past, remote mirroring of slow Wide Area Network (WAN) links masked the performance degradation at the remote site. The imminent availability of high speed links will avoid the historical bottleneck, exposing the performance degradation caused by purely sequential command execution.

SUMMARY

According to some embodiments of a disclosed storage system, ordering commands in a communication system comprises receiving a stream of command requests, performing the requested commands, relaying the requested commands to a target, and embedding task attributes in the relayed commands to increase concurrency in commands performed by the target.

BRIEF DESCRIPTION OF THE DRAWINGS

Embodiments of the invention relating to both structure and method of operation, may best be understood by referring to the following description and accompanying drawings.

DETAILED DESCRIPTION

A storage system uses task attributes to manage intelligent asynchronous remote mirroring. An illustrative technique communicates the ordering relationship of a series of commands in an asynchronous remote mirroring application, exploiting the capabilities of task attributes to improve remote mirroring performance. The technique enables a primary site to communicate a precedence graph of a command stream along with the commands to a secondary site so that the secondary site has more flexibility in scheduling execution of commands locally. The flexibility in turn contributes to an asynchronous remote mirroring implementation with faster response times than are otherwise possible. In a particular embodiment, the technique can be implemented in accordance with the Small Computer Systems Interface (SCSI), internet SCSI (iSCSI), and/or any other SCSI transport that ensures command ordering, using SCSI task attributes. Standard SCSI task attributes include Simple, Ordered, Head of Queue, and Auto Contingent Allegiance (ACA) attributes that are described in detail hereinafter.

A precedence graph, as generally defined herein, describes possible execution ordering relationships between related tasks within a set of tasks in a system. The precedence graph specifies ordering criteria imposed on the tasks in a manner that enables flexibility of a task execution scheduler to select one execution sequence from a group of possible execution sequences, all of which satisfy the particular precedence graph. This flexibility enables the task scheduler to pick the most optimal execution sequence for the subsystem executing the tasks, while ensuring correctness of the execution sequence.

Usage of task attributes to manage ordered command or task execution improves over conventional asynchronous mirroring techniques that execute commands on a mirror node in strict sequential order to preserve data consistency. Sequential execution is sufficient to maintain consistency but imposes a stronger constraint than is required to maintain consistency, resulting in poorer performance.

Inferring the intended execution relationships among the tasks and using task attributes on the primary side enables generation of a write command stream for the secondary site with an embedded precedence graph that is precise but with improved flexibility in comparison to the explicit precedence graph originating with the initiator. The flexible precedence graph in turn gives freedom to the secondary site to intelligently reorder Simple tasks to derive an improved or maximum throughput.

Figure 1:
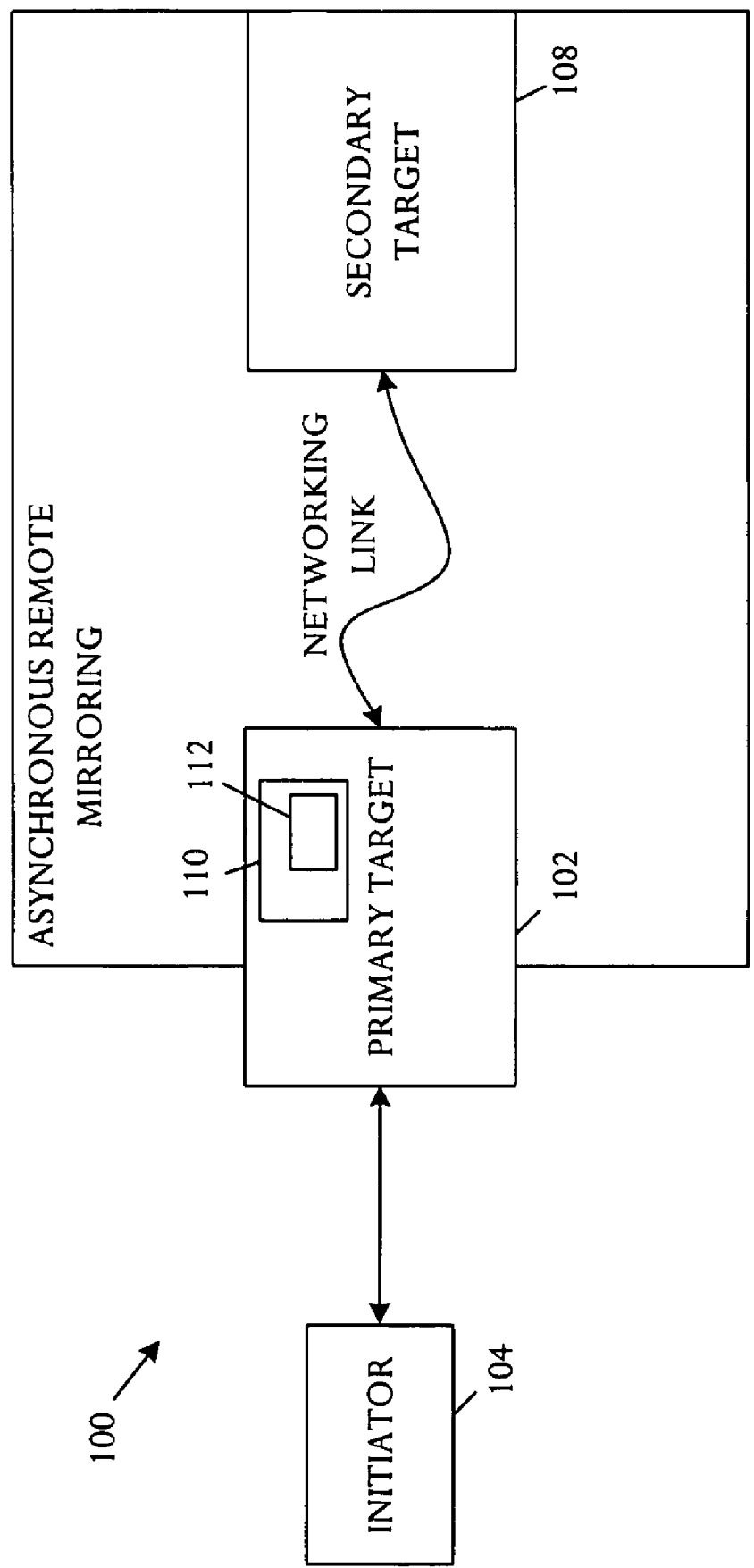
FIG. 1 is a schematic block diagram depicting an embodiment of a storage system that includes a device with capability to embed task attributes in a command stream to manage asynchronous remote mirroring.

Referring to FIG. 1, a schematic block diagram illustrates an embodiment of a storage system 100 that includes a device 102. The device 102 can be used in the storage system 100 that is generally connected or networked to communicate with multiple devices. In a typical instantiation, the storage system 100 can be considered to include an initiator 104, a primary target 102, and a secondary target 108. An initiator 104 is defined as a device, for example a Small Computer Systems Interface (SCSI) device that requests an input/output (I/O) process to be performed by another device, generally called a target. In the illustrative embodiment, the device 102, a primary target, and the secondary target 108 are target devices in compliance with the definition.

The system 100 is configurable to perform asynchronous remote mirroring. The target device 102 comprises a target controller 110 that can communicate with the initiator 104 and perform operations requested by the initiator 104. The target controller 110 is capable of receiving a stream of command requests from the initiator 104, performing the requested commands, and asynchronously relaying the requested commands to a secondary target 108. The target controller 110 embeds task attributes in the relayed commands that can increase concurrency in commands performed by the secondary target 108.

In the asynchronous remote mirroring application, the initiator 104 sends write commands to the primary target 102. The primary target 102 performs write operations that are requested and responds to the initiator 104 in the same manner as for non-mirroring applications, concluding the commands with status information. However, in addition to the actions for non-mirroring applications, the primary target 102 asynchronously conveys the same write commands along with the corresponding write data to the secondary target 108, typically located at a geographically remote location from the primary target location. The secondary target 108 performs the write operations post-facto so that, to ensure conformity between the primary and secondary storage, the execution sequence of the writes on the secondary target 108 satisfies the same precedence graph as the writes on the primary target 102. Satisfying the same precedence graph means that the same writes are to be committed in an order on the secondary target 108 that satisfies constraints established by the precedence graph on the primary 102, so that data on the secondary target 108 are always usable by the applications and thus considered to have "data consistency." The desire of a disaster recovery application is to enable one or more other initiators that can access information from the secondary storage to correctly interpret the data on the secondary target 108 in the event of breaking of the mirrored link at a random point in time. Loss of some transactions due to the asynchronous nature of the mirroring is acceptable, but data consistency of the secondary data should never be incorrect or ambiguous.

A simple and straightforward technique to ensure precedence graph equivalence has been to record the exact execution order of each command on the primary target 102 and communicate the ordered list to the secondary target 108 to enable the secondary target 108 to execute the commands in precisely the same order, thereby preserving execution-order equivalence. Execution-order equivalence is a more highly constrained subcase of precedence graph equivalence. The difficulty with a system constrained to execution-order equivalence is that execution of a list of commands in a purely sequential order at the secondary target 108 could extend for a much longer time than the execution schema followed at the primary target 102 where many commands can execute concurrently and in unconstrained order.

The illustrative storage system 100 introduces a technique whereby remote command execution is not constrained to be purely sequential, but can instead include elements of concurrency approaching the concurrency of performance at the primary storage target 102. In another aspect that can be implemented in some embodiments, the storage system 100 can implement a method by which the primary storage target 102 can determine command attributes to ensure correct operation at the secondary target 108 in the case that the initiator does not provide the attributes.

The disclosed improved technique for managing mirroring is highly useful with the emergence of high-speed Ethernet in metropolitan areas, typically with a radius of approximately 50 miles and beyond, making higher-performance wide area mirroring affordable. In the past, practical mirroring schemes have been limited in performance by relatively low-bandwidth wide-area networking so that the constraint of sequential ordering has not been noticeable. With the high-speed network capabilities, the performance bottleneck of sequential execution at the secondary target 108 can greatly limit performance.

The target controller 110 can receive a command stream from the initiator 104 that includes specification of task attributes, other than the Simple attribute, describing an execution schema to be enforced. The target controller 110 reconveys information including the commands and embedded task attributes to the secondary target 108 so that the execution schema is the same in the device 102 and the secondary target 108. Targets are capable of performing commands containing embedded task attributes.

In some circumstances, the target controller 110 receives a command stream from the initiator 104 that omits specification of task attributes explicitly describing a precedence graph to be enforced or simply marks all commands as Simple. In fact, in current usage, initiators 104 that employ task attributes to manage command ordering are rare or unknown. In the absence of received task attributes, the target controller 110 determines implied task attributes from the command stream, embeds the implied attributes into the command stream, and conveys the commands and implied task attributes to the secondary target 108. The implied task attributes can improve concurrency in commands performed by the secondary target 108.

In a particular embodiment, the target controller 110 includes a processor 112 capable of executing a control process for determining the implied task attributes in a command stream. The process further tracks the active number of write tasks for a nexus relating the initiator, target, and the logical unit. The nexus in this context is defined as a relationship that begins with establishment of an initial connection and usually stays intact as long as the initiator and the target are continuously up and communicating with one another. An initiator/target (I_T) nexus is a nexus existing between an initiator and a target. An initiator/target/logical unit (I_T_L) nexus is a nexus existing between an initiator, a target, and a logical unit.

In an illustrative embodiment, Small Computer Systems Interface (SCSI) Architecture Model (SAM-2) defines the following four task attributes: Simple, Ordered, Head of Queue, and Auto Contingent Allegiance (ACA). A SCSI initiator may assign an attribute to any task issued to a device server on a SCSI target. A task with the Simple attribute is accepted into a task set in the dormant state. The task with the Simple attribute does not enter an enabled state until all older Head of Queue and older Ordered tasks in the task set have ended. In the dormant state, a task is prevented from completing due to the presence of particular other tasks in the task set. While a task in the dormant state, any information a logical unit receives for the task is suspended and therefore unavailable to the task. In the enabled state, a task may become a current task and may complete at any time, subject to task completion constraints specified by control mode. A current task has a data transfer protocol service request in progress or is in the process of returning command status. A task accepted into the task set only completes or becomes current by entering the enabled state. A task is quiescent, producing no effects detectable by an application client other than usage of target resources sufficient to preserve task state, until the task transitions to the enabled state. Undetectable effects such as prefetching of data to be written to media can prior to entry into the enabled state. A task in the ended state is removed from the task set.

A task with the Ordered attribute is also accepted into the task set in the dormant state. The Ordered attribute task does not enter the enabled state until all older tasks in the set have ended. A task with the Head of Queue attribute is accepted into the task set only in the enabled state. A task with the Auto Contingent Allegiance (ACA) attribute is also accepted into the task set only in the enabled state. A task set can accept at most one ACA task.

In the illustrative embodiment, in addition to complying with the SAM-2 standard semantics, the control process executing on the processor determines whether a received task has no task attribute or is a Simple task. In either case, the task is tentatively marked as Ordered if the active number of write tasks for the nexus is zero. If the active number is not zero, the task is marked as Simple.

For a received task with no task attribute or a Simple task attribute during presence of the tentatively marked Ordered task, the control process demotes the Ordered task to a Simple task and marks the newly received task as a Simple task.

For received tasks with attributes of Ordered, Head of Queue, or Auto Contingent Allegiance (ACA), the control process marks the task with the specified task attribute.

The illustrative process for determining implied task attributes ensures correct operation at the secondary target 108 in the absence of attributes supplied from the initiator 104. The process applies Ordered and Simple task attributes to a stream of pipelined commands to convey a precise precedence graph for commands issued by the initiator 104 and improves command execution efficiency in the secondary target 108.

Figure 2:
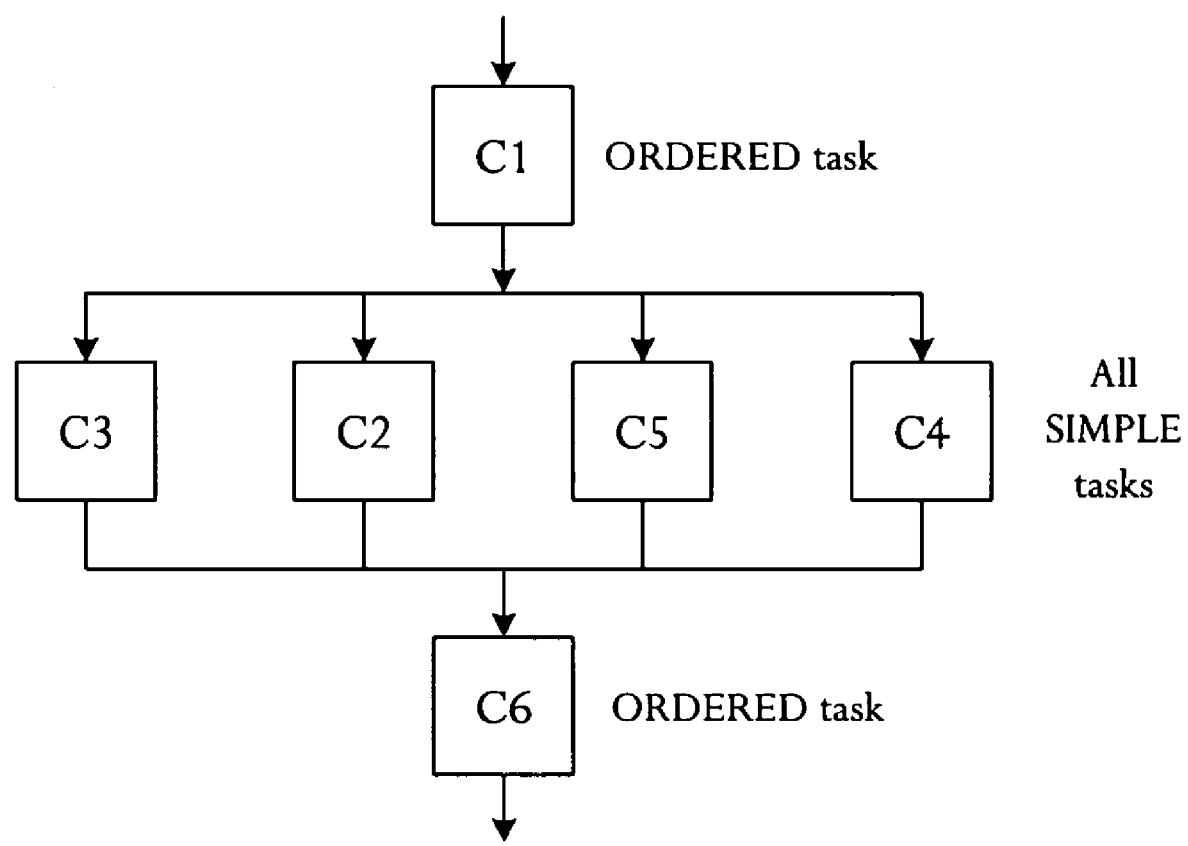
FIG. 2 is a schematic block diagram that illustrates an execution sequence order as interpreted by a device server.

Referring to FIG. 2, a schematic block diagram illustrates the task precedence graph as interpreted by a device server. SAM-2 defines ordering constraints that each of the SCSI task attributes conveys to the device server that is servicing the task. In some embodiments of the illustrative system and the operating methods disclosed herein, judicious usage of Ordered and Simple attributes can be applied to a stream of pipelined commands to convey the precise precedence graph for the commands that the initiator issues, assuming the commands are transported to the secondary target in the order of transmission. FIG. 2 illustrates how the receiving device server may interpret the ordering attributes. In the illustration, the commands are numbered in the chronological order of sending by the initiator to the target. Specifically, the initiator sends the commands in the order C1, C2, C3, C4, C5, and C6, with the commands C1 and C6 specified as Ordered tasks and the remainder specified as Simple tasks. The device server, upon receiving the commands, infers the precedence graph as shown. The device server may execute commands C3, C2, C5, and C4 in any order, or even one or more may execute concurrently, because no ordering relationship across the four tasks is defined by the initiator.

The SCSI task attributes can be used to realize a more intelligent asynchronous remote mirroring implementation than the strictly sequential technique. More specifically, usage of SCSI task attributes can lead to realization of the goal of precedence graph equivalence, as opposed to less flexible execution-ordering equivalence.

Initiators can be considered to fall into two classes for usage in a remote asynchronous mirroring application. A first class, termed herein Class A for simplicity, does not use SCSI task attributes. The Class A initiators control execution ordering using a simple stop-and-wait approach. The initiator issues a stream of commands that the device server may execute in any order, and stops when execution of a next command, or example an Ordered command, must follow execution of all preceding commands. Upon receiving responses of all previous commands, the Class A initiator issues the waiting, intended to be Ordered, command. In essence, Class A initiators may use an untagged class or a tagged class with a Simple task attribute when a single task is outstanding, but uses tagged tasks with the Simple task attribute when multiple tasks are outstanding for the particular Initiator_Target_LUN (I_T_L) nexus.

A second class, termed herein Class B, does use SCSI task attributes effectively. Class B initiators issue commands with appropriate SCSI task attributes that describe the precedence graph to be followed as depicted in FIG. 2. A class B initiator conveys a desired precedence graph to the primary storage target with the assistance of task attributes, such as SCSI task attributes. The task attribute concept may not be sufficiently rich to capture an ideal precedence graph in the perspective of the initiator; however the concept is sufficiently rich to describe a precedence graph that enables the storage targets to select a reasonably efficient execution sequence.

In terms of known deployment in conventional SCSI system usage, Class A initiators vastly outnumber Class B initiators. In fact, the existence of Class B initiators is rare or unknown, although the systems and methods disclosed herein may motivate emergence of Class B initiators, which benefit from increased performance of a storage subsystem by avoiding the performance limitations of stop-and-wait command ordering.

An illustrative device server operating as a primary target in an asynchronous remote mirroring application that uses SCSI task attributes to improve mirroring performance can embed the attributes into a command stream directed to a subsequent target based on the class of initiator that commences the command stream. For Class B initiators, the device server simply conveys the SCSI task attribute information to a secondary target precisely as received so that the secondary target may have the same execution flexibility as the primary target. For Class A initiators, the device server implements a technique for determining implied attributes when the initiator does not convey attributes.

In the case of Class A initiators, a primary target that supports asynchronous remote mirroring does not have the benefit of the storage application's intended precedence graph due to the absence of task attributes, but only has access to the specific execution sequence executed on the primary side.

Figure 3:
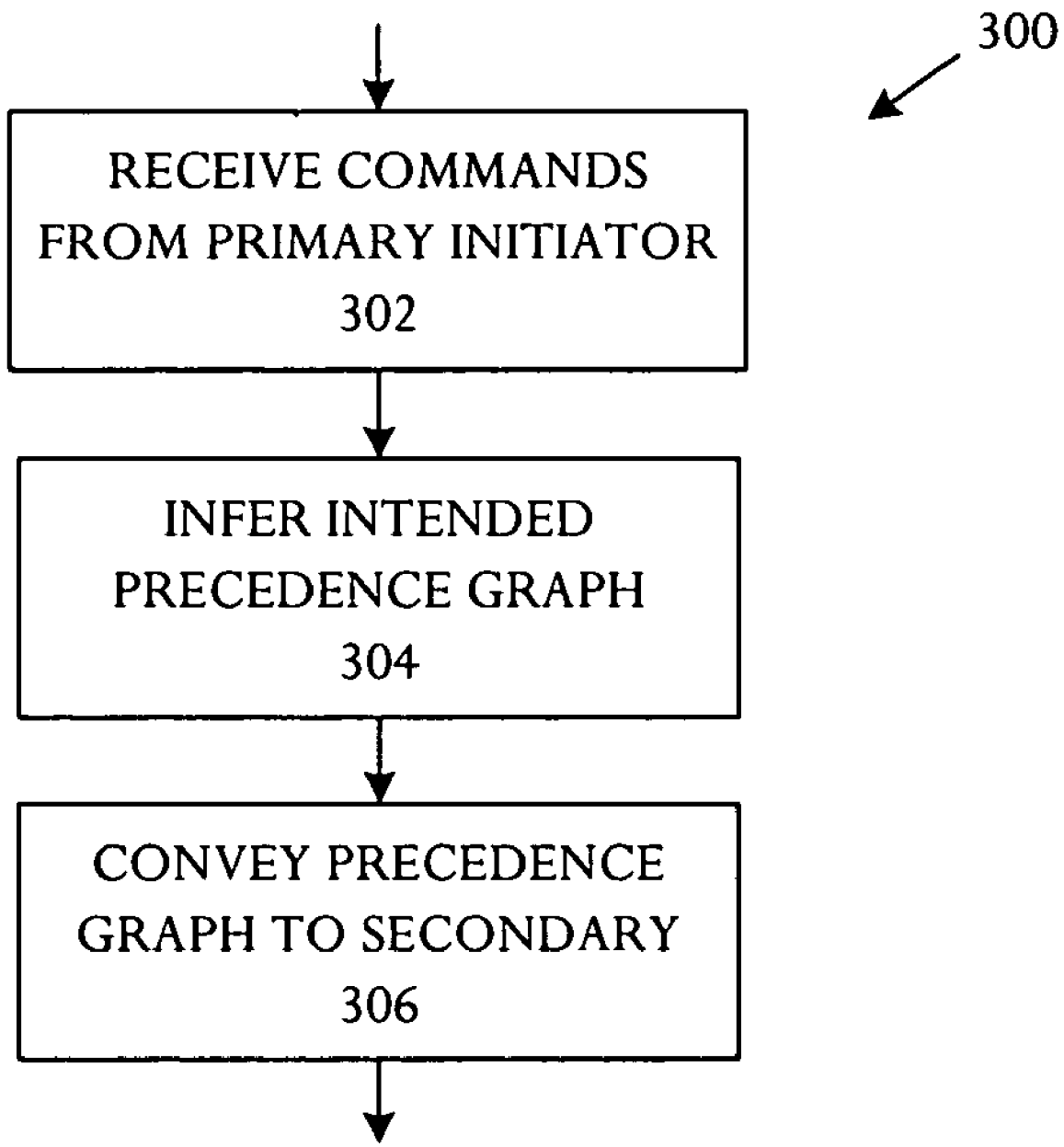
FIG. 3 is a flow chart depicting an embodiment of a method utilized by the illustrative system that enables the primary target to improve performance using inference of a precedence graph.

Referring to FIG. 3, a high-level block diagram shows the functional decomposition of a typical embodiment of a method enabling the primary target to transcend prior performance limitations. The remote mirroring method 300 comprises receiving commands from a primary initiator 302, and inferring a task precedence graph intended by the primary target by tracking concurrency of issued tasks 304 between the primary and secondary targets. The inferred task precedence graph is conveyed to the secondary target 306. The illustrative technique enables derivation of the intended precedence graph for any family of storage protocols.

An illustrative technique infers an intended precedence graph such as the inferred precedence graph 304. The primary storage target can sense the intended task precedence graph by tracking transition points dependent on ordinality of commands in a command stream. For example, the initiator may switch at a first transition point from multiple outstanding write tasks, even briefly, to a no outstanding write tasks. At a second transition point, the initiator may switch from one or fewer outstanding write tasks to multiple outstanding write tasks.

When multiple write tasks are outstanding, the initiator is clearly not expecting any order among the writes since the writes can be completed in any order. However, the first transition point (TP1) can be construed as the initiator's intent to enforce an order between all concluding outstanding tasks and the commands to follow. The construed intention is a prediction that will not always be correct. However, the prediction of the primary target is a conservative assumption to ensure correctness in inferring the precedence graph. The second transition point (TP2) is an indication that the initiator does not care about execution order among the multiple outstanding write tasks recently initiated by the initiator.

In summary, the primary target uses several principles in inferring the intended precedence graph of commands issued by a Class A initiator. Outstanding tasks that are multiple, for example following the second transition point, are marked as Simple tasks.

The first task following the first transition point is marked an Ordered task. Alternatively, an Ordered no-operation (no-op) command, for example a SCSI Test Unit Ready command, may be inserted. In the case a no-op command is inserted, the first task following the first transition point is tentatively marked as Ordered, but can be demoted back to a Simple task as soon as the number of outstanding commands exceeds one.

All commands that are issued by the initiator one after another are marked as Ordered.

Figure 4:
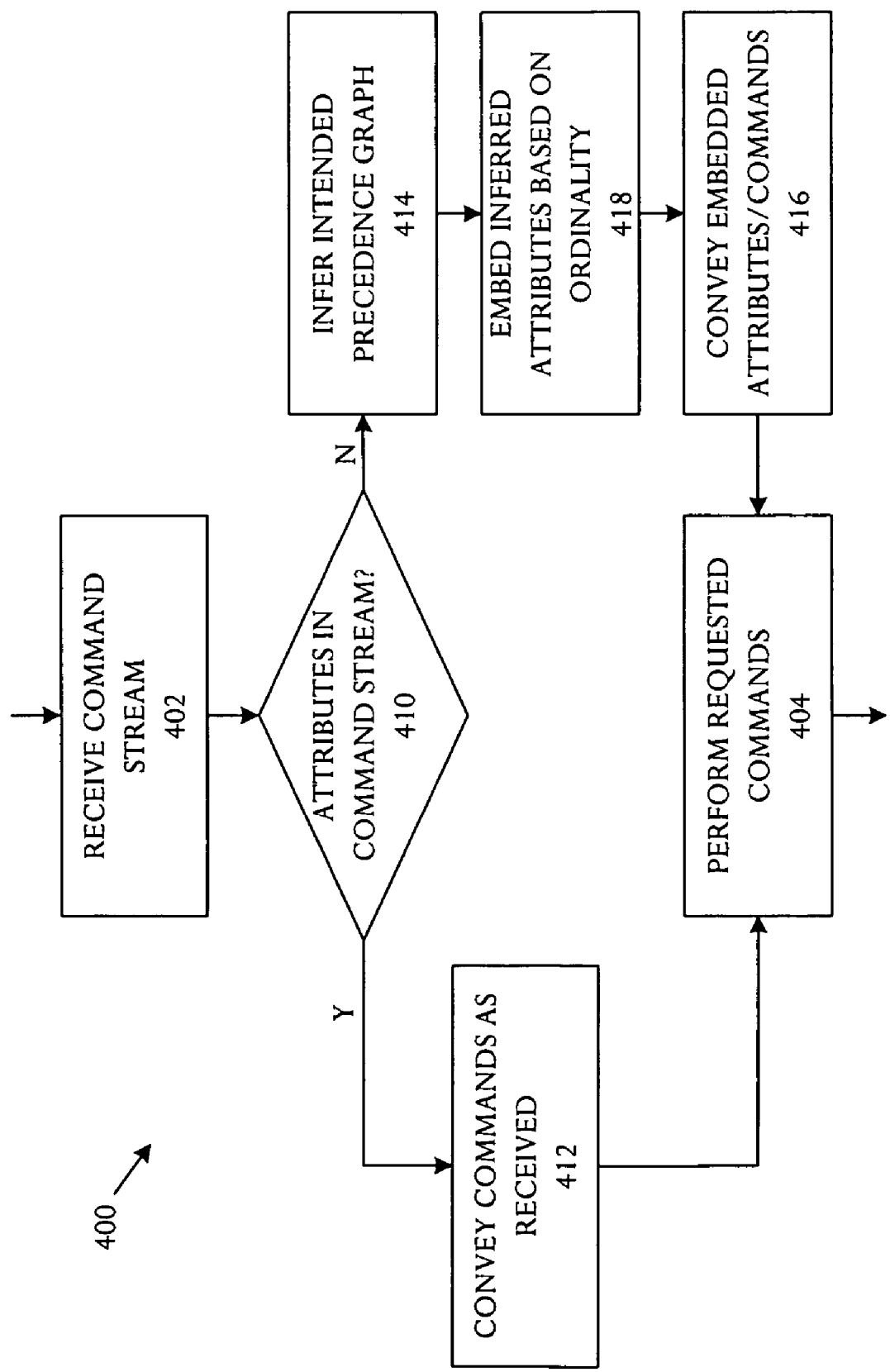
FIG. 4 is a flow chart illustrating an embodiment of a method for ordering commands in a communication system.

Referring to FIG. 4, a flow chart illustrates an embodiment of a method 400 of ordering commands by inferring a precedence graph. The method comprises receiving a stream of command requests 402, inferring the commands if not supplied in the stream, and performing the requested commands 404.

In some circumstances, the received command stream includes specification of task attributes describing an execution schema to be enforced, if so as determined by logic block 410, received attributes are simply reconveyed along with the received commands 412. In other circumstances, the received command stream omits specification of task attributes that would describe an execution schema to be enforced. If task attributes are omitted, the system determines implied task attributes from the command stream 414. In an illustrative embodiment, the task attributes are determined 414 by inferring the primary initiator's intended precedence graph by tracking concurrency of issued tasks. The primary storage target conveys the commands and implied task attributes to enable improvement in concurrency in commands performed by the target 416.

The implied task attributes are embedded into the command stream to ensure correct operation in the absence of the initiator supplying the attributes 418.

In an illustrative embodiment, the method can execute in a device such as a Small Computer Systems Interface (SCSI) device and the task attributes are SCSI task attributes including Simple, Ordered, Head of Queue, and Auto Contingent Allegiance (ACA) task attributes.

The method for ordering commands in a communication system 400 can be used for various applications, such as for relaying commands in a remote asynchronous mirroring application.

A method can be used to determine implied task attributes from a command stream. In an illustrative embodiment, the method executes on a processor, for example a processor in the target controller, or other suitable device. A method includes maintaining an active write count, thereby tracking the currently active number of write tasks for a nexus that relates the initiator, targets, and logical units (LUNs). Tracking can be performed by incrementing the active_write_count upon arrival of a new write task on the nexus, and decrementing the count upon completion of a previously outstanding write task.

Whenever the active_task_count falls to zero, one of the following operations is performed. In one alternative, a no-operation (no-op) command, marked as Ordered, is inserted in the precedence graph to be propagated to the secondary target. A no-op_inserted flag is set to one. In a second alternative, the no-op_inserted flag is set to zero.

If a new write task arrives, several operations are performed. Since the initiator is a Class A initiator, the received task is either an Untagged task or a Simple task. If the active_task_count is set to zero and no-op_inserted is set to one, the new task is marked tentatively as an Ordered task. The task can be termed a promoted task or P-task.

If the active_write_count is set to zero and no-op_inserted is set to zero, the new task is marked as Ordered.

If the active_write_count is set to one and a tentatively set P-task exists, the P-task is demoted back to a Simple task. If the P-task cannot be demoted because the precedence graph for the P-task has already been propagated to the secondary target, for example because the degree of synchrony between the primary and secondary targets is relatively small, the system disregards the condition. The precedence graph propagated by the primary side inadvertently over-constrains the secondary execution ordering, but the propagated precedence graph remains valid and leads to correct results.

If the active_task_count is set to one or more in all other cases, the new task is marked as a Simple task.

The technique for forming a precedence graph may be configured as an independent process. A separate and independent asynchronous process that executes within a storage target can convey the precedence graph formed by the illustrative method to the secondary target. Only the operation, which occurs when the P-task exists, uses information regarding status of asynchronous job transfer at a particular time to determine operations, the only cross-communication between processes. Except for this limited cross-communication, the asynchronous job can be considered a standard remote mirroring daemon.

Application of the disclosed technique generates a write command stream, for example a SCSI write command stream, for the secondary site such that the command stream can embed a much more flexible, although precise, precedence graph. The resulting precedence graph can improve on the original execution scheme generated by the initiator. For example, task attributes can be embedded that enable the commands to execute in parallel on the secondary site and/or to execute in a different order that maintains precedence graph equivalence. The flexible execution schema produced by the illustrative technique gives the secondary site freedom to intelligently reorder the SIMPLE tasks to derive a maximum throughput.

Figure 5:
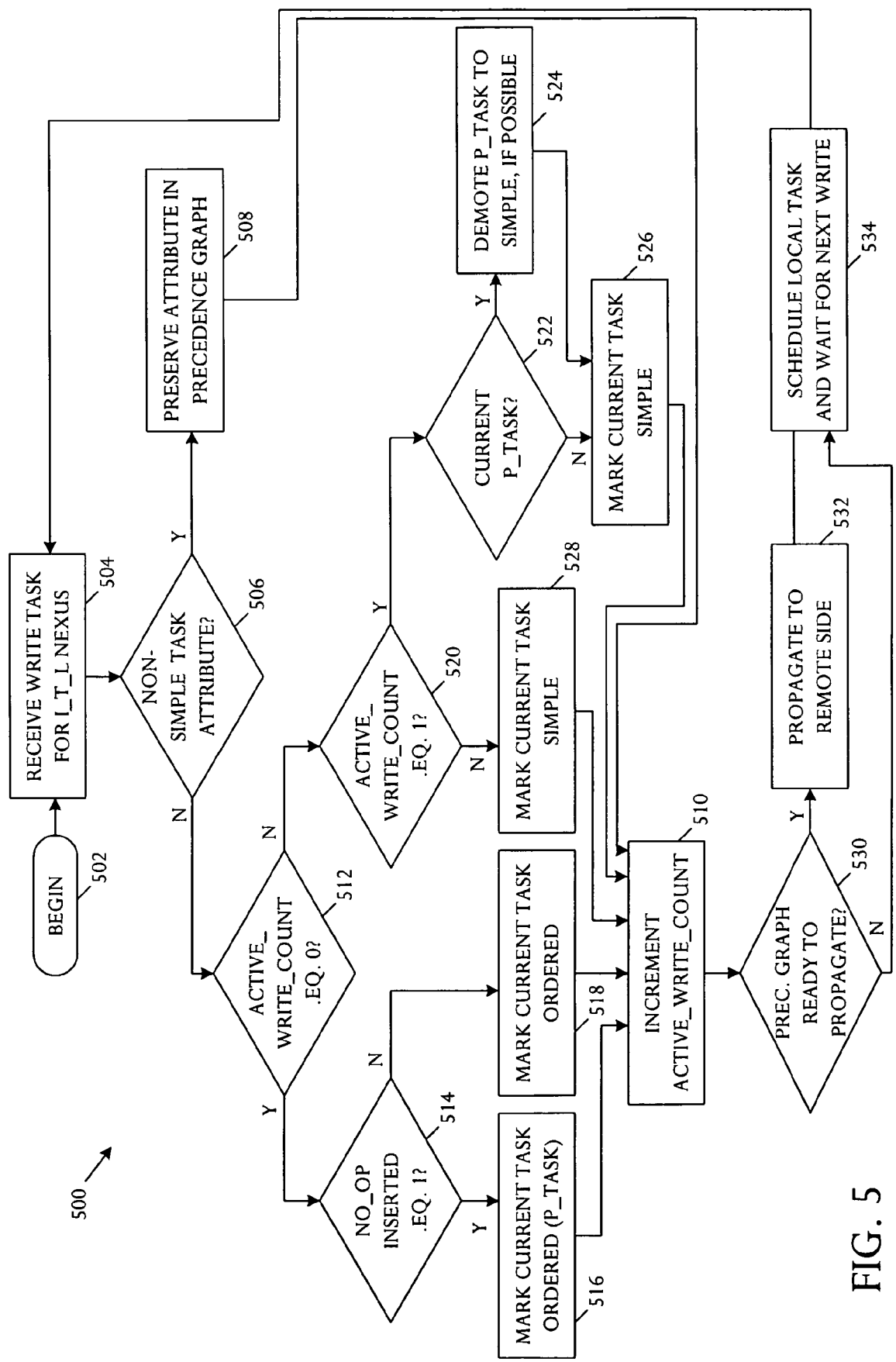
FIGS. 5 and 6 are flow charts illustrating an alternative embodiment of a method used by a primary storage target to respond to commands from initiators.
Figure 6:
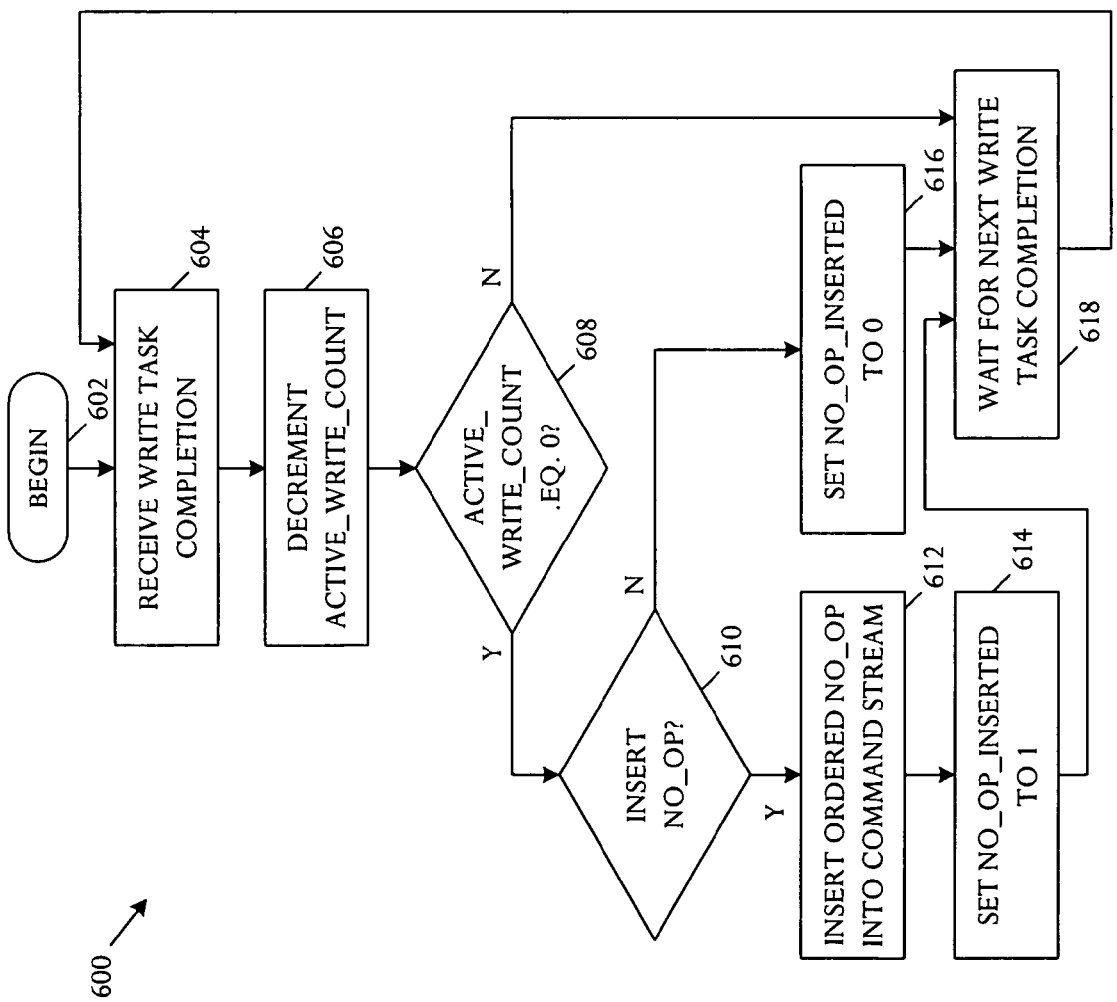

Referring to FIGS. 5 and 6, flow charts illustrate an alternative embodiment of a method used by a primary storage target to respond to commands from initiators. FIG. 5 depicts task initiation 500. The technique is used to determine the implied precedence graph of write tasks, such as SCSI write tasks, on an Initiator/Target/Logical Unit (LUN) I_T_L nexus at a primary target. The technique begins 502 with the primary target receiving a new write task for the I_T_L nexus 504. The primary target determines whether the task is Simple or Untagged 506. If the task has an attribute different from Simple, then the attribute is preserved in a precedence graph 508, and active_write_count is incremented 510.

For a task to receive an inferred task attribute, the primary target determines whether active_write_count is equal to zero 512. If so, the primary target determines whether a no-operation (no-op) command has been inserted into the command stream 514. In an illustrative embodiment, a no-op_inserted parameter is set to one for the condition that the no-op is inserted into the command stream. If no-op_inserted is equal to one, the primary target marks the current task as Ordered and declares the task a Promoted task, or P_task, 516. If a no-op command has not been inserted into the command stream and no-op_inserted is thus set to zero, the primary target marks the current task as Ordered 518.

For a task that is to receive an inferred task attribute in a condition that active_write_count is not equal to zero, the primary target determines whether the active_write_count is equal to one 520. If so, the primary target determines whether a P_task presently exists 522. If so, the P_task is demoted to a Simple task, if possible, 524. If demoting the promoted task to a Simple task is not possible because the precedence graph for the P_task was previously propagated to the secondary target, changing of the precedence graph is ignored or omitted. Ignoring the change in the precedence graph is allowable since the condition is one in which the primary target has inadvertently over-constrained the secondary execution ordering and the information propagated remains a valid precedence graph that produces correct results. The condition of inadvertent propagation of the precedence graph may occur due to a relatively small degree of asynchrony between the primary and secondary targets. Whether or not a promoted task exists, the primary target marks the current task as Simple 526.

For a task to receive an inferred task attribute in a condition that active_write_count is greater than one, the primary target marks the current task as Simple 528.

In all cases, after preserving the attribute 508 or marking the current task in actions 516, 518, 526, and 528, the primary target increments active_write_count by one 510 and determines whether the precedence graph is ready for propagation 530. Readiness for propagation is managed by a standard remote mirroring daemon, an asynchronous job running within the storage target that conveys the precedence graph constructed by the task initiation technique 500.

If the precedence graph is ready for propagation, the primary target propagates the precedence graph to the remote or secondary target 532. In either case, the primary target schedules the local task and waits for the next write command 534, looping to action 504.

FIG. 6 depicts task completion 600 performed by the primary storage target in response to write task completion. The technique begins 602 with the primary target receiving a write task completion 604 from the secondary target. The primary target decrements the active_write_count by one 606 and determines whether active_write_count decrements to zero 608. If active_write_count is equal to zero, the primary target determines whether a no-operation (no-op) command is to be inserted into the command stream 610. A no-op command, for example a SCSI Test Unit Ready command, may be inserted into the command stream for a first task following an initiator switch from multiple outstanding write tasks, even briefly, to no outstanding write tasks. If a no-op may be inserted, the primary target inserts the no-op, as an Ordered task, into the command stream 612 and sets the no-op_inserted flag to one 614.

If the no-op may not be inserted, the primary target sets the no-op_inserted flag to zero 616. In any case, the primary target waits for the next write task completion 618 and loops to the action 604.

Figure 7:
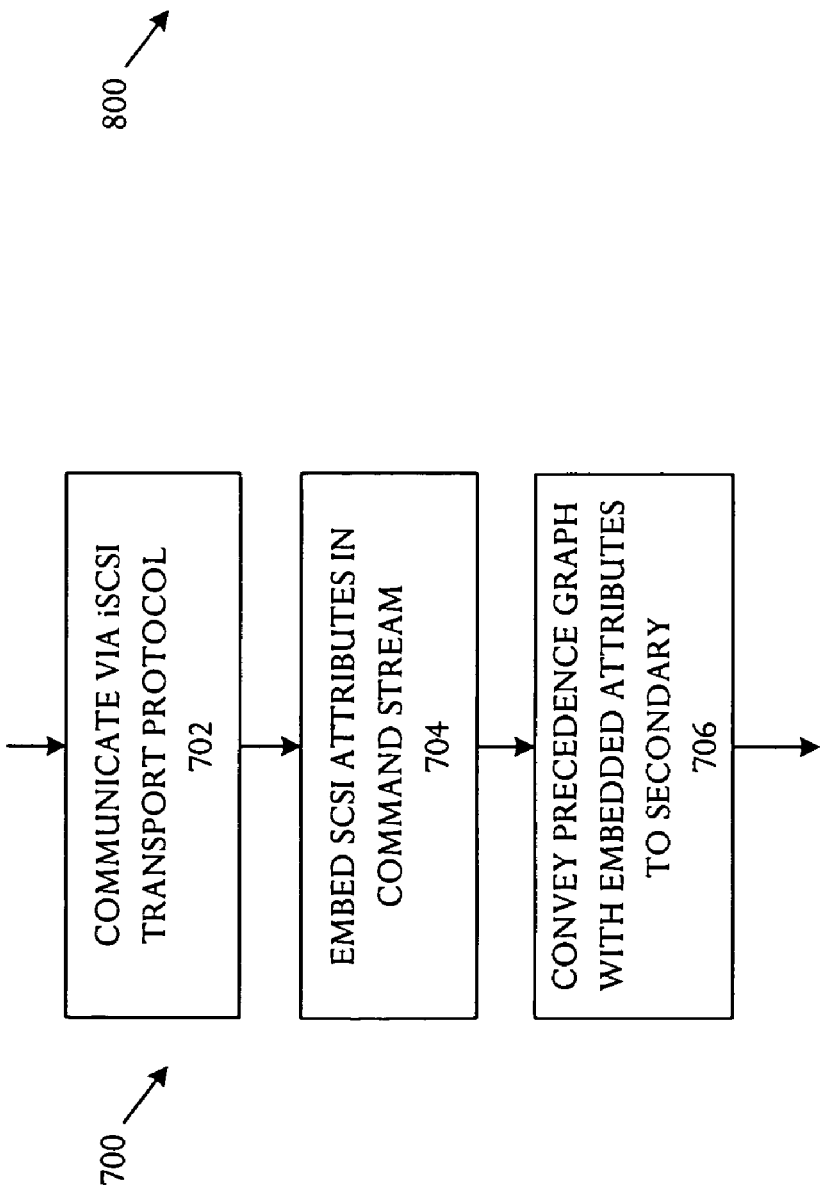
FIG. 7 is a flow chart showing another embodiment of a method for ordering commands in a communication system.

Referring to FIG. 7, a high-level schematic flow chart depicts another embodiment of a method for ordering commands in a communication system 700. The method includes the action of communicating information via the internet Small Computer Systems Interface (iSCSI) transport protocol 702, and embedding Small Computer Systems Interface (SCSI) task attributes in a received command stream 704. The Precedence graph is conveyed with the embedded attributes to the secondary 706.

Figure 8:
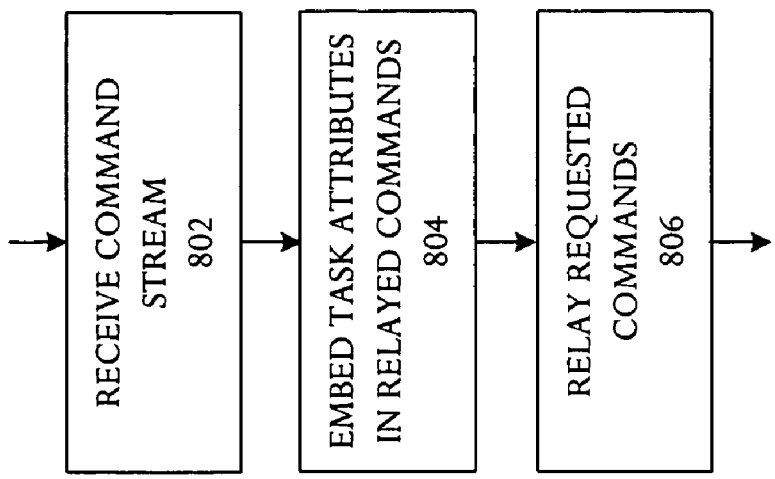
FIG. 8 is a flow chart that illustrates a further embodiment of a method for ordering commands in a communication system.

Referring to FIG. 8, a high-level schematic flow chart illustrates a further embodiment of a method for ordering commands in a communication system 800. The method comprises receiving a stream of command requests 802, embedding task attributes in the relayed commands 804, and relaying the requested commands 806. The embedded task attributes improve transaction ordering for a remote mirroring application using an ordered transport. One example of an ordered transport is the iSCSI protocol.

The various functions, processes, methods, and operations performed or executed by the system can be implemented as programs that are executable on various types of processors, controllers, central processing units, microprocessors, digital signal processors, state machines, programmable logic arrays, and the like. The programs can be stored on any computer-readable medium for use by or in connection with any computer-related system or method. A computer-readable medium is an electronic, magnetic, optical, or other physical device or means that can contain or store a computer program for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type. A computer-readable medium can be any structure, device, component, product, or other means that can store, communicate, propagate, or transport the program for use by or in connection with the instruction execution system, apparatus, or device.

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

Figure 9:
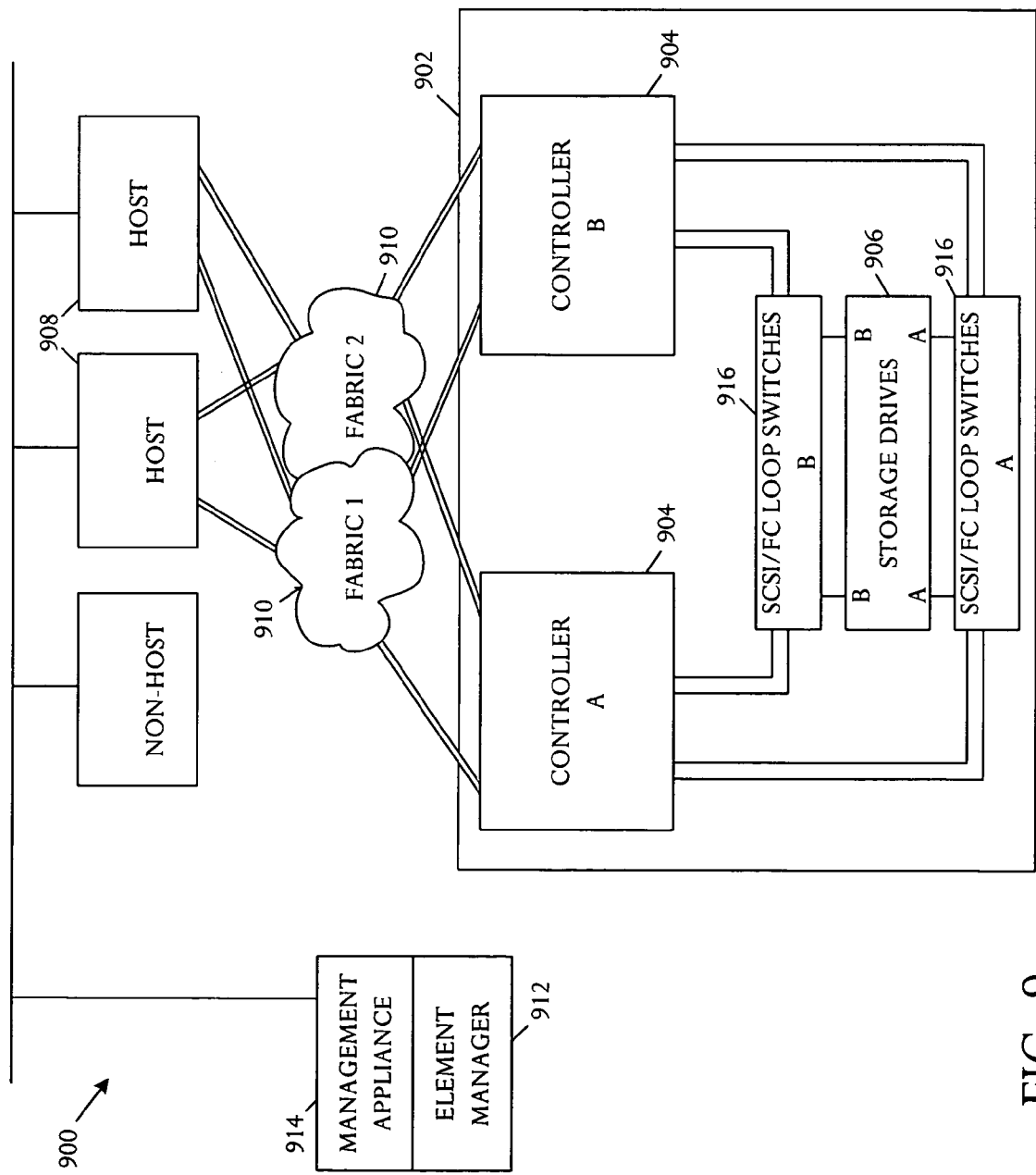
FIG. 9 is a schematic block diagram showing an embodiment of a storage system that can be used to implement the disclosed technique for managing command ordering using task attributes.

Referring to FIG. 9, a schematic block diagram shows an embodiment of a storage system 900 that can be used to implement the disclosed technique for managing command ordering using task attributes. The storage system 900 includes multiple storage devices 902, such as a disk array, that includes storage drives and controllers of the drives. The depicted storage device 902 includes two controllers 904 that are mutually connected to a storage drives 906, for example an array of disk drives. The storage devices 902 communicate information including data and commands among many host systems 908 via one or more network fabrics 910. The depicted system includes an element manager 912, which resides on a management appliance 914, which also connects to the network fabrics 910. The disclosed technique for managing command ordering generally executes on one or more of the controllers 904, although some systems can possibly execute the technique in other processors or controllers. The controller pair 904 connects to interface loop switches 916, such as iSCSI and or Fibre Channel (FC) switches.

Figure 10:
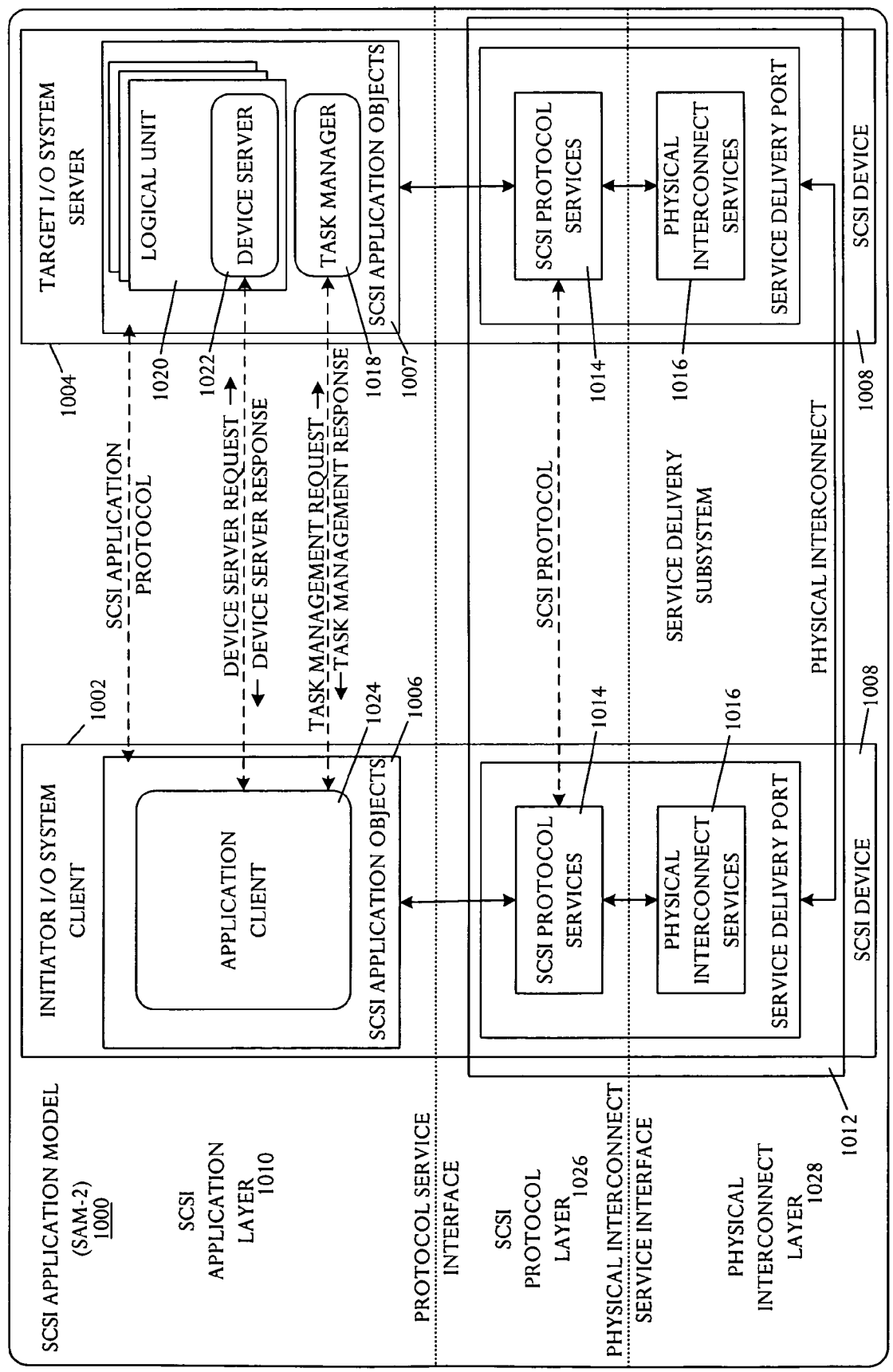
FIG. 10 is a schematic block diagram that depicts an embodiment of a communication system according to the SCSI Architecture Model (SAM-2) for distributed communications.

Referring to FIG. 10, a schematic block diagram depicts an embodiment of a communication system 1000 according to the SCSI Architecture Model (SAM-2) for distributed communications. The communication system 1000 manages ordering of commands by communicating information via an internet Small Computer Systems Interface (iSCSI) transport protocol. The system 1000 further embeds Small Computer Systems Interface (SCSI) task attributes in a received command stream to ensure an ordering behavior sufficient for attaining correct algorithm operation.

For a particular transactions, the illustrative system 1000 combines operations of two SCSI devices that function respectively as an initiator input/output (I/O) system client 1002 and a target I/O system server 1004. The initiator I/O system client 1002 makes operation requests and the target I/O system server 1004 is a SCSI device that performs an operation requested by the initiator I/O system client 1002.

Internet SCSI (iSCSI) is a SCSI transport protocol designed to operate on top of Transmission Control Protocol (TCP), thereby enabling running of SCSI application protocols on Transmission Control Protocol/Internet Protocol (TCP/IP) networks, such as the Internet. The iSCSI session abstraction is equivalent to the SCSI initiator/target (IT) nexus with the iSCSI session ensuring the delivery of ordered commands initiator I/O system client 1002 to the target I/O system server 1004. SAM-2 defines the initiator/target (I_T) nexus as a relationship between the initiator I/O system client 1002 and the target I/O system server 1004.

A SCSI device, for example the initiator I/O system client 1002 or the target I/O system server 1004, includes SCSI application objects 1006 and a service delivery port 1008. The SCSI application objects 1006 run in a SCSI application layer 1010. The SCSI application layer 1010 conforms to SAM-2 and SCSI command standards. The service delivery ports 1008 of the initiator I/O system client 1002 and target I/O system server 1004, in combination, form a service delivery subsystem 1012. In each SCSI device and extending through the system 1000, the SCSI application objects 1006 are separated from the service delivery port 1008 by a protocol service interface. The service delivery ports 1008 contain SCSI protocol services 1014 that intercommunicate among the SCSI devices in the system 1000 via the SCSI protocol, and physical interconnect services 1016 that intercommunicate via a physical interconnect. In each SCSI device and extending through the system 1000, the SCSI protocol services 1014 and the physical interconnect services 1016 are separated by a physical interconnect service interface. The SCSI protocol services 1014 run in a SCSI protocol layer 1026 that is compliant with the SCSI Protocol Standard. For iSCSI, the SCSI Protocol Standard includes iSCSI/TCP/IP. The physical interconnect services 1016 run in a physical interconnect layer 1028 that is compliant with the Physical Interconnect Standard, including various wired and wireless standards.

The SCSI application objects 1007 for the target I/O system server 1004 include a task manager 1018, and one or more logical units 1020. The logical units 1020 contain device servers 1022 and possibly other types of units. The SCSI application objects 1006 for the initiator I/O system client 1002 include an application client 1024. The SCSI application objects 1006 which operate as clients for the initiator I/O system client 1002 and SCSI application objects 1007 which operate as clients for the target I/O system server 1004 communicate using the SCSI application protocol. The application client 1024 also communicates with the device server 1022 in the target I/O system server 1004, sending device service requests and receiving device service responses from the device server 1022. The application client 1024 also communicates with the task manager 1018, sending task management requests and receiving task management responses from the task manager 1018.

The iSCSI technology enables applications involving communication among the initiator I/O system client 1002 and the target I/O system server 1004 capable of deployment over a large area cover practically unlimited geographical distances. Applications enabled by iSCSI technology include, for example, asynchronous remote mirroring, remote tape vaulting, and widely dispersed Storage Area Networks (SANs). Avoidance of long transmission delays allows applications in which the initiator I/O system client 1002 streams SCSI commands back-to-back without waiting for the SCSI status of previous commands. Various types of applications may or may not demand consistency of ordered command execution. For example, a mirroring application typically constrains write operations to ordered execution on a remote SCSI target to preserve data consistency of data on the target in a long latency network.

In the iSCSI system, the SCSI I_T nexus maps directly to the iSCSI session, an iSCSI protocol abstraction that spans one or more TCP connections. The iSCSI protocol defines the semantics to obtain one logical flow of bidirectional communication on the I_T nexus that potentially spans as many as $2^{16}$ individual TCP connections. The multiple iSCSI connections are completely contained at the iSCSI layer with the SCSI layer presented with a single I_T nexus even in a multiple-connection session.

The task manager 1018 performs task set management function handling by specifying an ordered sequence of steps for the iSCSI layer on the target I/O system server 1004. Two task management functions, ABORT TASK SET and CLEAR TASK SET, are used to manage SCSI task sets. ABORT TASK SET aborts all active tasks in a session. CLEAR TASK SET clears tasks in the task set. The sequence of steps ensures that the initiator I/O system client 1002 receives the SCSI response protocol data units (PDUs) of all unaffected tasks before the task management function response arrives, regardless of the number of connections in the iSCSI session.

Responsibility for ensuring ordered command delivery is imposed on the target I/O system server 1004 with the initiator I/O system client 1002 free to use or omit command ordering. In a particular embodiment, the iSCSI targets, operating as servers in a client-server model, do not attempt to establish behavior of the initiators regarding command ordering but rather always supply an ensured ordered delivery service.

The SCSI application layer has command standards that can be used to enforce ordering. SAM-2 defines the four task attributes of SIMPLE, ORDERED, HEAD OF QUEUE, and ACA. Each task directed to a logical unit may be assigned an attribute. The standard defines the ordering of constraints that each attribute conveys to the device server 1022 that services the task. Judicious use of ORDERED and SIMPLE attributes applied to a stream of pipelined commands conveys the precise precedence graph for the commands issued by the initiator I/O system client 1002, so long as the commands are received in the same order on the target I/O system server 1004.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, the disclosed embodiments are compliant with the Small Computer Systems Interface (SCSI) and utilize SCSI task attributes. Any other suitable transport, interface, or standard can be used that defines attributes appropriate for command or task scheduling. Also, the disclosed embodiments depict particular system configurations, the apparatus and technique can be used in any communication configuration with any appropriate number of storage elements. The system can be implemented with various operating systems and database systems. The control elements may be implemented as software or firmware on general purpose computer systems, workstations, servers, and the like, but may be otherwise implemented on special-purpose devices and embedded systems.

What is claimed is:

1. A device capable of usage in a storage system including an initiator, a primary target, and a secondary target, the device being capable of configuration for asynchronous remote mirroring functionality and comprising:
    a target controller capable of communicating with the initiator and performing operations requested by the initiator; and
    a process on the target controller capable of receiving a stream of command requests from the initiator, performing the requested commands, relaying the requested commands to a secondary target while ensuring precedence graph equivalence between received and relayed commands, the process tracking outstanding write tasks, marking write tasks with task attributes according to changes in number of outstanding write tasks, and embedding task attributes in the relayed commands capable of increasing concurrency in commands performed by the secondary target, wherein the target controller is a Small Computer Systems Interface (SCSI) device and the task attributes are SCS/task attributes including Simple, Ordered, Head of Queue, and Auto Contingent Allegiance (ACA) task attributes.

2. The device according to claim 1 further comprising:
    the target controller capable of communicating with the initiator and performing operations requested by the initiator as a primary target; and
    a process on the target controller that receives a command stream from the initiator that specifies task attributes describing en execution sequence order, and reconveys the commands and task attributes to the secondary target so that the execution order is the same in the primary target and the secondary target.

3. The device according to claim 1 further comprising:
    a process on the target controller that receives a command stream from the initiator that omits specification of task attributes describing an execution sequence order, determines implied task attributes from the command stream based on ordering of tasks, and conveys the commands and implied task attributes to the secondary target, enabling improvement in concurrency in command execution by the secondary target.

4. The device according to claim 3 further comprising:
    a process on the target controller that determines implied task attributes from the command stream further comprising:
        a process that infers an intended precedence graph of a primary initiator by tracking concurrency of issued tasks; and
        a process that conveys the inferred preference graph to the secondary target.

5. The device according to claim 1 further comprising:
    the target controller capable of communicating with the initiator and performing operations requested by the initiator as a primary target; and
    a process on the target controller that determines implied task attributes from the command stream further comprising:
        a process that responds to a transition from less than two outstanding write tasks to multiple outstanding write tasks by marking the multiple outstanding write tasks as Simple tasks.

6. The device according to claim 1 further comprising:
a process on the target controller that determines implied task attributes from the command stream further comprising:
a process that responds to a transition from multiple outstanding write tasks to no outstanding write tasks by marking a subsequent write task as an Ordered task.

7. The device according to claim 1 further comprising:
a process on the target controller that determines implied task attributes from the command stream further comprising:
a process that responds to a transition from multiple outstanding write tasks to no outstanding write tasks by inserting an Ordered no_op command and tentatively marking a subsequent write task as an Ordered task, subject to demotion to a Simple task on subsequent multiple outstanding tasks.

8. The device according to claim 1 further comprising:
a process on the target controller that determines implied task attributes from the command stream further comprising:
a process that tracks an active number of write tasks for a nexus relating the initiator, targets, and logical units (LUNs);
a process responsive to no active write tasks that inserts a no-op command marked as Ordered in a precedence graph to be propagated to the secondary target;
a process responsive to no active write tasks that sets a no-op_inserted flag to zero;
a process responsive to no active write tasks and a no-op_inserted flag set to one that marks a new write task temporarily as an Ordered and promoted task;
a process responsive to no active write tasks and a no-op_inserted flag set to zero that marks a new write task as an Ordered task;
a process responsive to one active write task in which a promoted task exists that demotes the promoted task to a Simple task; and
a process responsive to at least one active write task that marks a new write task to a Simple task.

9. The device according to claim 1 further comprising:
a process on the target controller that determines command attributes to ensure correct operation at the secondary target in the absence of the initiator supplying the attributes.

10. A method of ordering commands in a communication system comprising:
receiving a stream of commands; performing the commands;
relaying the commands to a target;
tracking outstanding write tasks;
marking write tasks with task attributes according to changes in number of outstanding write tasks; and
embedding the task attributes in the relayed commands to increase concurrency in commands performed by the target wherein the task attributes are SCSI task attributes including Simple, Ordered, Head of Queue, and Auto Contingent Allegiance (ACA) task attributes; for operation in a Small Computer Systems Interface (SCSI) device.

11. A method according to claim 10 further comprising:
inferring an intended precedence of the commands; and embedding task attributes in the relayed commands according to the intended precedence to increase concurrency in commands performed by the target.

12. A method according to claim 10 further comprising:
receiving a command stream that omits specification of task attributes describing an execution sequence order;
determining implied task attributes from the command stream; and
conveying the commands and implied task attributes to enable improvement in concurrency in commands performed by the target.

13. A method according to claim 10 further comprising:
receiving at a primary target a command stream from an initiator that specifies task attributes describing an execution sequence order; and
reconveying the commands and task attributes from the primary target to a secondary target so that the execution order is the same in the primary target and the secondary target.

14. A method according to claim 10 further comprising:
tracking an active number of write tasks for a nexus relating an initiator, a plurality of targets, and a plurality of logical units;
responding to no active write tasks at a primary target by inserting a no-op command marked as Ordered in a precedence graph to be propagated to a secondary target;
responding to no active write tasks by setting a no-op_inserted flag to zero;
responding to no active write tasks and a no-op_inserted flag set to one by marking a new write task temporarily as an Ordered and promoted task;
responding to no active write tasks and a no-op_inserted flag set to zero by marking a new write task as an Ordered task;
responding to one active write task in which a promoted task exists by demoting the prompted task to a Simple task; and
responding to at least one active write task by marking a new write task to a Simple task.

15. The method according to claim 10 further comprising:
determining command attributes to ensure correct operation in the absence of an initiator supplying the attributes.

16. The method according to claim 10 further comprising:
tracking concurrency of issued tasks;
inferring an intended precedence graph based on the tracked tasks; and
applying Ordered and Simple task attributes to a stream of pipelined commands to convey a precise execution sequence order for issued commands according to the inferred precedence graph to improve command execution efficiency.

17. The method according to claim 10 further comprising:
relaying commands in a remote asynchronous mirroring application.

18. A method of ordering Commands in a communication system comprising:
communicating information via an internet Small Computer Systems Interface (iSCSI) transport protocol;
tracking outstanding write tasks;
marking transitions in number of outstanding write tasks with Small Computer Systems Interface (SCSI) task attributes; and
embedding the Small Computer Systems Interface (SCSI) task attributes in a received command stream to ensure an ordering behavior sufficient for attaining concurrency performance and correct algorithm operation.

19. A method of ordering commands in a communication system comprising:
receiving a stream of command requests;
relaying the requested commands;
tracking outstanding write tasks;
marking write tasks with task attributes according to changes in number of outstanding write tasks; and
embedding the task attributes in the relayed commands to improve transaction ordering for a remote mirroring application using an ordered transport wherein the task attributes are SCSI task attributes including Simple, Ordered, Head of Queue, and Auto Contingent Allegiance (ACA) task attributes.

20. An article of manufacture comprising:
a tangible computer-readable medium having a program code for execution on a controller stored therein for ordering commands in a communication system, the program code further comprising:
a code that causes the controller to receive a stream of command requests;
a code that causes the controller to perform the requested commands;
a code that causes the controller to infer an intended precedence of the requested commands;
a code that causes the controller to relay the requested commands to a target;
a code that causes the controller to track outstanding write tasks;
a code that causes the controller to mark write tasks with task attributes according to changes in number of outstanding write tasks; and
a code that causes the controller to embed task attributes in the relayed commands according to the intended precedence to increase concurrency in commands performed by the target wherein the task attributes are SCSI task attributes including Simple, Ordered, Head of Queue, and Auto Contingent Allegiance (ACA) task attributes.

21. An article of manufacture comprising:
a tangible computer-readable medium having a program code for execution on a controller stored therein for ordering commands in a communication system, the program code further comprising:
a code that causes a controller to communicate information via an internet Small Computer Systems Interface (iSCSI) transport protocol;
a code that causes the controller to track outstanding write tasks;
a code that causes the controller to mark write tasks with task attributes according to chances in number of outstanding write tasks; and
a code that causes the controller to embed Small Computer Systems Interface (SCSI) task attributes in a received command stream to ensure an ordering behavior sufficient for attaining concurrency performance and correct algorithm operation.

22. An article of manufacture comprising: a tangible computer-readable medium having a program code for execution on a controller stored therein for ordering commands in a communication system, the program code further comprising:
a code that causes a controller to receive a stream of command requests; a code causing that causes the controller to relay the requested commands;
a code that causes the controller to track outstanding write tasks;
a code that causes the controller to mark write tasks with task attributes according to changes in number of outstanding write tasks; and
a code that causes the controller to embed task attributes in the relayed commands to improve transaction ordering for a remote mirroring application using an ordered transport wherein the task attributes are SCSI task attributes including Simple, Ordered, Head of Queue, and Auto Contingent Allegiance (ACA) task attributes.

23. A storage device in a communication system comprising:
means for receiving a stream of command requests;
means for performing the requested commands;
means for relaying the requested commands to a target;
means for tracking outstanding write tasks;
means for marking write tasks with task attributes according to changes in number of outstanding write tasks; and
means for embedding task attributes in the relayed commands capable of increasing concurrency in commands performed by the target wherein the task attributes are SCSI task attributes including Simple, Ordered, Head of Queue, and Auto Contingent Allegiance (ACA) task attributes.

24. A remote mirroring method comprising:
communicating information between a primary initiator and a secondary target;
inferring a task precedence graph intended by the primary initiator by tracking concurrency of issued tasks;
conveying the inferred task precedence graph to the secondary target; and
sensing the inferred task precedence graph by tracking transition points dependent on ordering of commands in a command stream
wherein tracking transition points further comprises tracking of switching events comprising:
switching at a first transition point from a multiple outstanding write task condition to a no outstanding write task condition; and
switching at a second transition point from one or fewer outstanding write tasks to multiple outstanding write tasks.

25. The remote mirroring method according to claim 24 further comprising:
inferring the intended task precedence graph comprising:
marking multiple outstanding tasks at the second transition point as Simple tasks;
marking a first task following the first transition point as an Ordered no-op command; and
marking as Ordered all commands issued by the initiator in a sequence.

26. The remote mirroring method according to claim 25 further comprising:
after marking the no-op command:
tentatively marking a first task following the first transition point as Ordered, wherein the marked Ordered task is demoted to a Simple task when the number of outstanding commands exceeds one.

* * * * *

UNITED STATES PATENT AND TRADEMARK OFFICE
CERTIFICATE OF CORRECTION

PATENT NO.         : 7,363,541 B2                                   Page 1 of 1
APPLICATION NO. : 10/785500
DATED               : April 22, 2008
INVENTOR(S)       : Randolph B. Haagens et al.

It is certified that error appears in the above-identified patent and that said Letters Patent is hereby corrected as shown below:

In column 12, line 8, delete "(IT)" and insert -- (I_T) --, therefor.

In column 14, line 18, in Claim 1, after "commands," insert -- and asynchronously --.

In column 14, line 28, in Claim 1, delete "SCS/" and insert -- SCSI --, therefor.

In column 14, line 37, in Claim 2, delete "en" and insert -- an --, therefor.

In column 16, line 37, in Claim 14, delete "prompted" and insert -- promoted --, therefor.

In column 16, line 58, in Claim 18, delete "Commands" and insert -- commands --, therefor.

In column 17, line 52, in Claim 21, delete "chances" and insert -- changes --, therefor.

Signed and Sealed this

Twenty-ninth Day of July, 2008

JON W. DUDAS
*Director of the United States Patent and Trademark Office*